United States Patent [19]

Thome

[11] Patent Number: 5,848,267

[45] Date of Patent: Dec. 8, 1998

[54] COMPUTER SYSTEM SPEED CONTROL USING MEMORY REFRESH COUNTER

[75] Inventor: Gary W. Thome, Tomball, Tex.

[73] Assignee: Compaq Computer Corporation, Houston, Tex.

[21] Appl. No.: 953,096

[22] Filed: Oct. 17, 1997

Related U.S. Application Data

[63] Continuation of Ser. No. 739,827, Oct. 30, 1996, abandoned, which is a continuation of Ser. No. 323,045, Oct. 14, 1994, abandoned.

[51] Int. Cl.⁶ .............................. G06F 1/12; G06F 9/455
[52] U.S. Cl. .................... 395/559; 395/551; 395/560; 395/527; 395/500; 395/800.32
[58] Field of Search .............................. 395/800.32, 500, 395/527, 559, 560, 551

[56] References Cited

U.S. PATENT DOCUMENTS

| | | | |
|---|---|---|---|
| 5,041,962 | 8/1991 | Lunsford | 364/200 |
| 5,125,088 | 6/1992 | Culley | 395/500 |
| 5,241,681 | 8/1993 | Hamid et al. | 395/800 |
| 5,289,584 | 2/1994 | Thome et al. | 395/436 |
| 5,414,829 | 5/1995 | Fandrich et al. | 395/428 |

FOREIGN PATENT DOCUMENTS

| | | |
|---|---|---|
| 051 920 | 5/1982 | European Pat. Off. . |
| 260 568 | 3/1988 | European Pat. Off. . |
| 428 917 | 5/1991 | European Pat. Off. . |
| 440 451 | 8/1991 | European Pat. Off. . |

OTHER PUBLICATIONS

Intel® 82C54 Chmos Programmable Interval Timer Data Sheet, Oct. 1994.

*Primary Examiner*—Alyssa H. Bowler
*Assistant Examiner*—John Follansbe
*Attorney, Agent, or Firm*—Pravel, Hewitt & Kimball

[57] ABSTRACT

A computer system which provides for slowing the effective speed of a microprocessor. The microprocessor includes a disabling input that when deactivated disables operations of the microprocessor on the processor bus. A computer system according to the invention periodically deasserts this signal with the certain duty cycle, allowing the microprocessor to continue to perform necessary functions at an effective rate compatible with older microprocessors, but never requiring an actual clock frequency change. This periodic deassertion is performed in response to a memory refresh counter that periodically counts down to zero and is reloaded. By comparing an input/output register with the refresh counter, and by adjusting the input/output register, the deasserting signal to the processor is periodically deasserted with a selectable duty cycle.

17 Claims, 3 Drawing Sheets

COMPUTER SYSTEM SPEED CONTROL USING MEMORY REFRESH COUNTER

This is a continuation of application Ser. No. 08/739,827, filed Oct. 30, 1996 now abandoned, which is a continuation of U.S. application Ser. No. 08/323,045, filed Oct. 14, 1994 now abandoned.

BACKGROUND OF THE INVENTION

1. Field of the Invention

This invention relates to microprocessor based computer systems. More particularly, the invention relates to a method of and apparatus for controlling effective microprocessor speed using the computer system's refresh counter.

2. Description of the Related Art

Since its beginnings, the personal computer industry has seen virtually unchecked advances occur at an almost exponential pace. These advances continue to achieve the remarkable goals of developing personal computers that are simultaneously more powerful, faster, and yet smaller than the preceding generations.

These advances, however, have led to compatibility problems for software developed to run on older, slower microprocessors. This is especially apparent in copy protection schemes developed for earlier computers and in computer game software whose effective speed depends on the speed of execution of the microprocessors. When run on the newer, faster microprocessors, the copy protection schemes often prevent disk accesses from working at all, and the game software runs at lightning speeds, totally unusable by a user. Some network drivers may also be rendered useless by the change in microprocessor speeds.

Hardware has been developed to adjust the effective speed of these newer, faster microprocessors without changing the processor clock rate. This is done by periodically stopping the CPU's execution for a predetermined amount of time, triggered by the refresh request every 15 microseconds in the microcomputer system. By adjusting the amount of time the microprocessor is stopped, the newer, faster microprocessors can be made to behave as an older, slower microprocessor, allowing execution speed dependent software to run properly, without having the problems associated with changing the clock frequency. This slowdown is further described in U.S. Pat. No. 5,125,088, entitled "Computer System Speed Control at Continuous Processor Speed," filed on Mar. 21, 1991, in Ser. No. 07/431,648, entitled "Computer System Having an Internal Cache Microprocessor Slowdown Circuit Providing an External Address Signal," allowed on Feb. 18, 1993, and in Ser. No. 08/175,145, entitled "Computer System Speed Control with Reduced Power Consumption," filed Dec. 29, 1993 now abandoned, all of which are hereby incorporated by reference.

These methods of speed control, however, require additional hardware to implement the slowdown circuitry. Given the highly integrated nature of computer systems today, any reduction in component count or simplification of such circuitry would be greatly desirable.

SUMMARY OF THE INVENTION

A microcomputer-based system constructed according to the invention includes a method of and apparatus for slowing down its effective speed without requiring a varying of the system clock frequency. This slowdown is achieved by circuitry closely connected to the memory refresh circuitry used in the computer system according to the invention.

Specifically, the system constructed according to the invention includes a refresh counter that periodically counts down to zero, causing a memory refresh. That refresh counter is then reloaded with an initial count. The output of this refresh counter is used to control the slowdown of the computer system according to the invention. Once the counter drops below a predetermined count, the microprocessor is placed in a halted state using a halt or a slowdown input of the microprocessor. Then, once this counter falls below a second predetermined threshold, or is equal to zero, the microprocessor is removed from this halted state.

By appropriately setting the threshold at which the microprocessor is placed into a halted state, the effective processor speed can be controlled. Generally, the processor will be halted for a certain percentage of each refresh period, and based on both the microprocessor type and various other aspects of the computer system, the system's effective speed can be made to appear that of a much older generation of computer.

Certain microprocessor inputs prevent the microprocessor from communicating over its address and data buses, but do not prevent the processor from running from its internal caches. When using such a microprocessor, the internal caches are turned off. Then, when the address and data line hold signal to the microprocessor is asserted, the processor effectively stops because its caches are disabled.

Thus using the refresh register, the effective speed of the computer system is elegantly and seamlessly controlled.

BRIEF DESCRIPTION OF THE DRAWINGS

A better understanding of the invention can be obtained when the following detailed description of the preferred embodiment is considered in conjunction with the following drawings, in which.

DETAILED DESCRIPTION OF THE PREFERRED EMBODIMENT

The following detailed description uses a particular terminology regarding active low signals. A signal followed by an asterisk is an active low signal. When such a signal is described as "asserted," that means the signal is at logical low level, which enables the functionality associated with the signal. The converse applies when a signal is "deasserted." For consistency and to avoid confusion, negation of a signal is also shown by adding an asterisk to the signal in the case of active high signals and by removing the asterisk for active low signals. When an input is physically a negative logic input (i.e., active low), that is noted.

Figure 1:
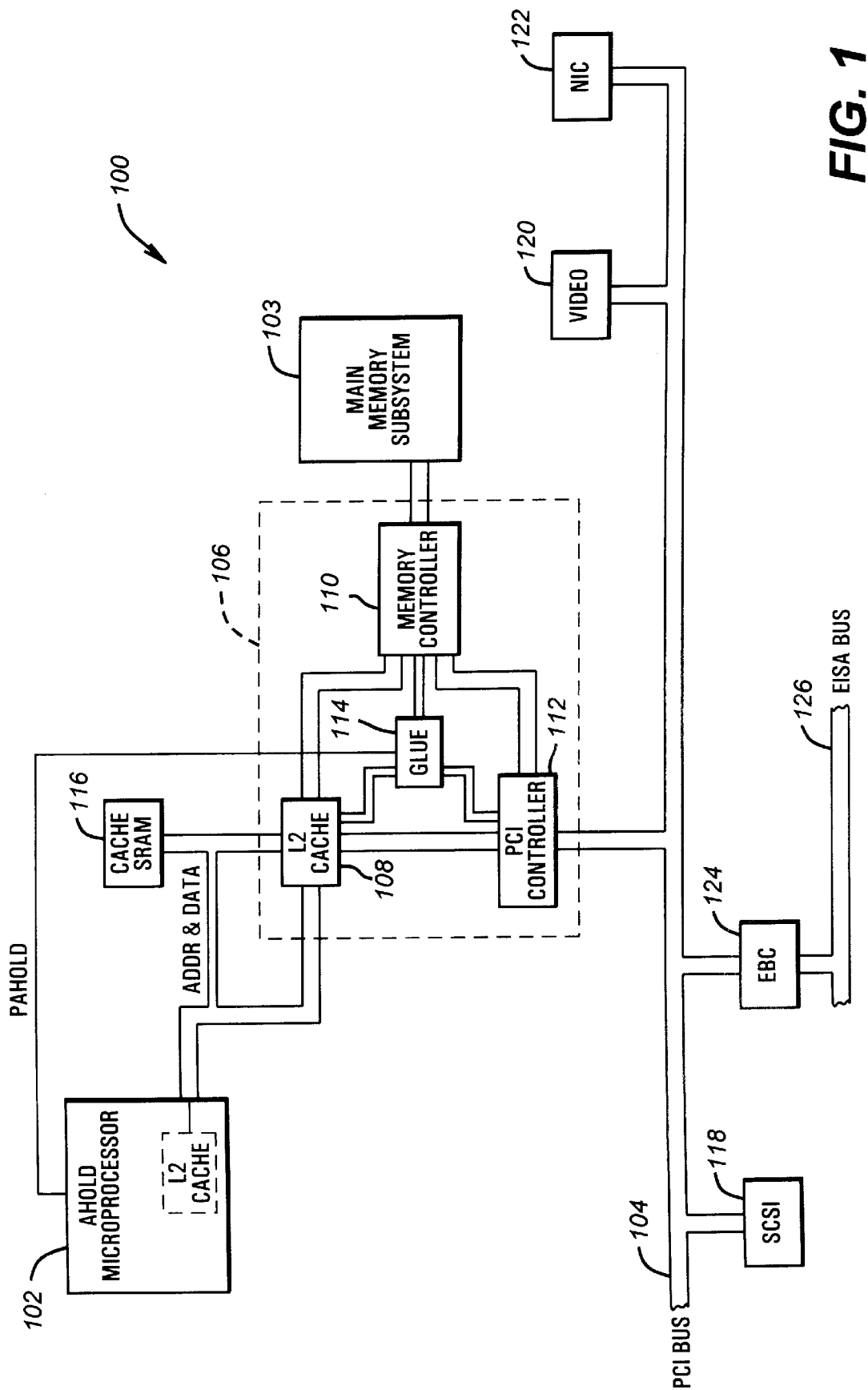
FIG. 1 is a block diagram of a computer system for incorporating the invention.

Turning now to the drawings, FIG. 1 shows a computer system 100 in which system slowdown according to the invention can be implemented. The computer system 100 includes a microprocessor 102 that is connected to a main memory subsystem 103 and a PCI bus 104 by a controller application specification integrated circuit (ASIC) 106. This controller ASIC 106 includes various circuitry blocks, including a level 2 (L2) cache controller 108, a memory controller 110, and a PCI controller 112. These logical blocks are connected by a delta configuration of control and address lines, as well as by glue logic 114. The L2 cache controller 108 directly couples the microprocessor 102 to a cache static ram (SRAM) 116. The memory controller 110 controls the main memory subsystem 103. The PCI controller 112 connects the PCI bus 104 to both the main memory subsystem 103 and the microprocessor 102. The various buses connecting the circuitry within the controller ASIC 106, as well as connecting the controller ASIC 106 to various devices, are illustrative. In actual practice, other chips would be included for controlling the data flow between the microprocessor 102, the cache SRAM 116, the main memory subsystem 103, and the PCI bus 104. These chips are omitted for clarity, but in any case are controlled by the controller ASIC 106. The controller ASIC 106 further handles any control and address signals between the microprocessor 102, the main memory subsystem 103, and the PCI bus 104. As is seen in FIG. 1, the microprocessor 102 is directly connected to the cache SRAM 116 address and data lines, although the control lines of the cache SRAM 116 are directly controlled by the controller ASIC 106.

Also connected to the PCI bus 104 are a SCSI subsystem 118, a video controller 120, and a network interface controller (NIC) 122. These devices are illustrative, and of course a wide variety of other devices could be connected to the PCI bus 104. An EISA bus controller (EBC) 124 further connects an EISA bus 126 to the PCI bus 104.

The computer system 100 of FIG. 1 is illustrative only and a wide variety of other computer systems could implement the system slowdown according to the invention. In the computer system of FIG. 1, the microprocessor 102 is preferably an 80486 or Pentium® processor by Intel, or one of the variety of processors in those families. It should include a processor slowdown input, here illustrated as AHOLD. The microprocessor 102 also preferably includes a level one (L1) cache 103. If the processor is a Pentium®, for example, the AHOLD input will not disable operations out of the L1 cache 103 if that cache is enabled. If the L1 cache 103 is disabled, however, the AHOLD input will disable processor operation when asserted. The cache SRAM 116 can be a direct mapped SRAM or two-way set associative SRAM, and in the two-way mode can be single or dual banked. Further, the cache SRAM 116 is preferably implemented using burst RAMs.

Figure 2:
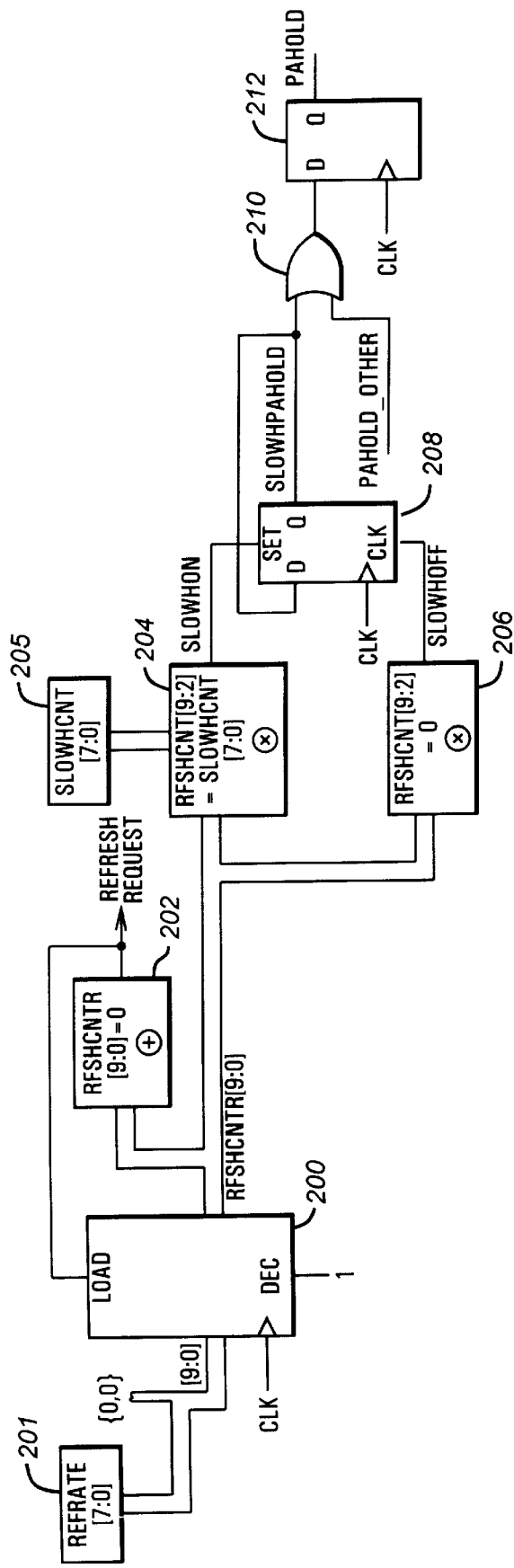
FIG. 2 is a schematic illustration of circuitry for generating the signal necessary to reduce the effective microprocessor speed.

Turning to FIG. 2, circuitry implemented in the glue logic 114 is shown implementing various features according to the invention. Specifically, the circuitry of FIG. 2 generates the processor AHOLD input. AHOLD is an address hold input that causes the microprocessor 102, in a 80486 or Pentium® series processor, to halt its external processing and wait for an external address for L1 cache 103 snooping. As discussed below in conjunction with FIG. 3, when slowdown is enabled, the L1 cache 103 is disabled, also permitting the AHOLD input to disable internal processing. Disabling of the L1 cache 103 will not adversely affect processor 102 operation, because it is desired to slow down the processor 102 anyway.

AHOLD is only one example of an input that can be used for the slowdown feature according to the invention. As discussed in the patents and applications previously incorporated by reference, other inputs that can be used are the HOLD input, the EADS* input, and the STPCLK input. When using the STPCLK input, it is not necessary to disable the L1 cache 103, because the STPCLK input halts all processor 103 operation, and not just external bus operation. One of skill in the microprocessor arts will readily understand the effect of using these different inputs and the change can be readily made without undue experimentation on the part of such a skilled artisan. The invention more specifically relates to the generation of the signal provided to such a microprocessor 102 halting input, rather than to providing the halting input itself.

In FIG. 2, a 10-bit refresh counter 200 is shown. It is driven by a system clock signal CLK and is implemented in a decrementing mode. As its inputs, the 10-bit refresh counter 200 includes an input from an 8-bit refresh rate register 201 REFRATE[7:0], which is typically set using a write operation to an input/output address in the controller ASIC 106. A true signal to the load input of the refresh counter 200 causes REFRATE to be loaded into the top eight bits of the refresh counter 200, with logic zeros being loaded into the lowest two bits. When the load input is then driven low, or false, a system clock signal CLK on the clock input then causes the refresh register 200 to count down on each clock cycle. Thus, the value of REFRATE[7:0] multiplied by four determines how many clock cycles will pass before the refresh register 200 counts down to zero.

The refresh counter 200 provides as outputs a group of signals RFSHCNTR[9:0], which is the refresh count. These signals are provided to a comparator 202, and when RFSHCNTR[9:0] equals zero, the comparator 202 provides a true output. This comparator 202 output performs two functions. First, when true this output instructs refresh logic, not shown, in the memory controller 110 to post a memory refresh cycle to the main memory subsystem 103. Second, the output of the comparator 202 forces the load input of the refresh counter 200 true, causing {REFRATE[7:0],0,0} to be loaded into the refresh counter 200.

The refresh counter 200 and the comparator 202 thus combine to generate a periodic output determined by the clock speed and REFRATE. This output causes the memory controller 110 to periodically refresh the main memory subsystem 103. Where CLK is a 50 MHz signal, REFRATE should be approximately 188 to cause memory to be refreshed every 15 microseconds, the preferred refresh rate.

According to the invention, the output of the refresh counter 200, is also used to assert and deassert a signal PAHOLD, which is provided to the AHOLD input of the microprocessor 102. An activating comparator 204 compares RFSHCNTR[9:2] with a slowdown count register 205 SLOWHCNT[7:0], which is also set using standard input/output operations to the controller ASIC 106. When RFSHCNTR[9:2] equals SLOWHCNT[7:0], the comparator 204 provides an enable slowdown output signal SLOWHON true.

Similarly, a deactivating comparator 206 also receives RFSHCNTR[9:2] as an input, and when the RFSHCNTR[9:2] equals zero, the deactivating comparator 206 provides a slowdown deactivating output signal SLOWHOFF true.

SLOWHON is then provided as the set input to a D-type flip-flop 208, while SLOWHOFF is provided as the clear input. The flip-flop 208 is clocked by CLK, and its D input is tied to its Q output, with the set and clear inputs being synchronous. The Q output of the flip-flop 208 provides a signal SLOWH_PAHOLD, which is provided as an input to an OR gate 210, where it is combined with other PAHOLD logic indicated by the OR gate 210 input signal PAHOLD_OTHER. The output of the OR gate 210 is then synchronized to the clock using a D-type flip-flop 212 and is provided as PAHOLD.

The system designer sets SLOWHCNT[7:0] to an appropriate value to reduce the effective system speed as desired. To totally disable the slowdown circuitry, the system designer sets SLOWHCNT[7:0] to a value greater than REFRATE[7:0]. The deactivating comparator 204 then never provides SLOWHON true, and SLOWH_PAHOLD stays false.

Because the effective processor speed is not solely a function of clock rate, the system designer must empirically determine an appropriate value of SLOWHCNT[7:0] to effectively emulate certain other older generations of processors. For example, a Pentium processor running at 50 MHz does not merely run five times as fast as an 80286 processor running at 10 MHz. Because the Pentium is more efficient at executing instructions, even if it were run at the same clock rate as a 10 MHz 80286, it would still effectively run faster. For this reason, the system designer must empirically determine the appropriate duty cycle at which SLOWH_PAHOLD should be asserted to emulate older generation processors.

The actual duty cycle is approximately given by the formula (REFRATE−SLOWHCNT)/(REFRATE). For example, if REFRATE is 200, and SLOWHCNT is 190, SLOWH_PAHOLD will be asserted approximately 95% of the time, and the processor would run at approximately 5% of its usual rate. Even if not used for compatibility purposes, if PAHOLD is instead provided to the STPCLK input, power savings will result.

This circuitry eliminates the need for an extra counter, instead simply requiring two comparators and flip flop. Compared to prior processor speed reduction circuitry, this elegant and efficient circuitry provides the equivalent functionality at a greatly reduced parts count.

Figure 3:
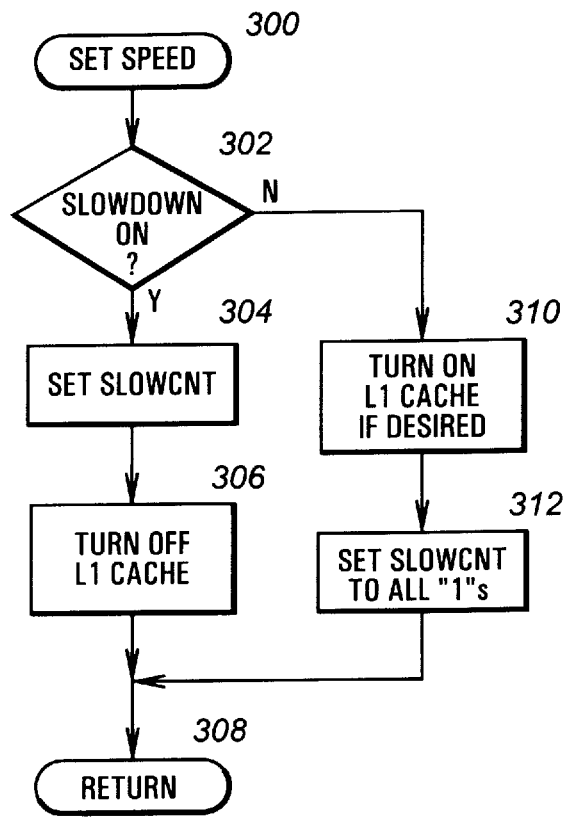
FIG. 3 is a flowchart illustration of a routine that would be used to set the effective microprocessor speed and enable and disable its L1 cache.

Turning to FIG. 3, a flowchart illustration of a SETSPEED routine 300 is shown. SETSPEED 300 would be called whenever a change in the effective microprocessor 102 speed was desired. For example, on startup, the computer system 100 would call SETSPEED 300 to set the effective microprocessor 102 speed to allow network drivers to work properly. Beginning at step 302, it is first determined whether microprocessor 102 slowdown mode is desired. If so, control proceeds to step 304, where SLOWCNT is set to the value desired as described in conjunction with FIG. 2 above. Control then proceeds to step 306, where the L1 cache 103, if enabled, is disabled. This prevents the microprocessor 102 from internally continuing to operate out of its L1 cache 103 even when AHOLD is asserted. Control then proceeds to step 308, where SETSPEED 300 returns from whatever routine called it.

If at step 302 it was determined that the slowdown mode is not on, control instead proceeds to step 310, where the L1 cache 103 is turned on if desired. Even when the microprocessor 102 is not running in an effectively reduced speed mode, it may be desirable not to have the L1 cache 103 turned on. In any case, the L1 cache 103 is set as desired by other system parameters, rather than being arbitrarily turned off as in step 306.

Proceeding from step 310 to step 312, SLOWCNT is then set to all "1"'s. As discussed above in conjunction with FIG. 2, this prevents SLOWHPAHOLD from ever being asserted. This in turn disables the slowdown mode. Control then proceeds to step 308, where SETSPEED 300 returns to its calling routine.

Thus, when running in slowdown mode, the L1 cache 103 is disabled and SLOWCNT is set to the appropriate value. When running in normal mode, the L1 cache 103 is not necessarily disabled, but is set according to other system parameters, and SLOWCNT is set to a value which prevents the assertion of the AHOLD input of the microprocessor 102 by the slowdown circuitry.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A method of reducing effective microprocessor speed in a computer system, the computer system including a refresh counter and a microprocessor having a disabling input, the method comprising the steps of:

detecting with a first comparator that the refresh counter has reached a first predetermined count;

asserting a disabling signal coupled to the disabling input in response to said detecting of said first predetermined count;

detecting with a second comparator that the refresh counter has reached a second predetermined count;

deasserting said disabling signal in response to said detecting of said second predetermined count;

detecting with a third comparator that the refresh counter has reached a third predetermined count; and invoking a refresh cycle in response to said detecting of said third predetermined count, wherein said firs, second, and third comparators are different comparators.

2. The method of claim 1, wherein the computer system includes an input/output register, said step of detecting that the refresh counter has reached a first predetermined count further comprising the step of comparing the refresh counter to the input/output register.

3. The method of claim 2, further comprising the step of setting a value in the input/output register to simulate discrete operating speeds of older generation microprocessors.

4. The method of claim 1, further comprising the step of setting said first predetermined count less said second predetermined count to simulate discrete operating speeds of older generation microprocessors.

5. The method of claim 1, wherein the microprocessor further includes an internal level one cache, the method further comprising the step of disabling the level one cache before said step of asserting a disabling signal.

6. A speed control circuit for controlling the effective speed of a microprocessor in a system including the microprocessor, a bus, and a refresh counter, said speed control circuit comprising:

a first compare circuit coupled to said refresh counter, said first compare circuit providing an indication of when said refresh counter reaches a first predetermined count;

a second compare circuit coupled to said refresh counter, said second compare circuit providing an indication of when said refresh counter reaches a second predetermined count;

microprocessor disable and enable logic, said logic coupled to said first compare circuit, said second compare circuit and the disabling input of said microprocessor, said microprocessor disable and enable logic providing a disabling signal to the disabling input in response to the indication that the refresh counter has reached the first predetermined count, and providing an enabling signal to the disabling input in response to the indication that the refresh counter has reached the second predetermined count; and a third compare circuit coupled to said refresh counter, said third compare circuit providing a refresh signal, wherein said three compare circuits are different circuits, and wherein said refresh counter is a single counter.

7. The system of claim 6, said speed control circuit further comprising:

an input/output register coupled to said bus, wherein said first predetermined count is held in said input/output register.

8. The system of claim 7, wherein said microprocessor provides a value to said input/output register such that the first predetermined count and the second predetermined count are of a ratio to simulate discrete operating speeds of older generation microprocessors.

9. The system of claim 8, wherein the discrete operating speed is suitable to run copy protected software on media in said peripheral storage device.

10. The system of claim 6, wherein said microprocessor further includes a disableable level one cache, wherein the level one cache is disabled responsive to said logic providing the disabling signal.

11. The computer system of claim 6, said microprocessor disable and enable logic further comprising:

a flip-flop with a set input coupled to the indication that the refresh counter has reached the first predetermined count, with a clear input coupled to the indication that said refresh counter has reached the second predetermined count, and with an output coupled to said disabling input.

12. A computer system with microprocessor speed control, comprising:

a bus with address and control lines;

a microprocessor coupled to said bus, said microprocessor having a disabling input;

a peripheral storage device coupled to said bus;

a memory subsystem coupled to said bus;

a memory controller for controlling said memory subsystem;

a refresh counter that periodically provides a refresh signal to said memory controller, causing said memory controller to initiate a refresh of said memory subsystem; and a speed control circuit, comprising:

a first compare circuit coupled to said refresh counter, said first compare circuit providing an indication of when said refresh counter reaches a first predetermined count;

a second compare circuit coupled to said refresh counter, said second compare circuit providing an indication of when said refresh counter reaches a second predetermined count;

microprocessor disable and enable logic, said logic coupled to said first compare circuit, said second compare circuit and the disabling input of said microprocessor, said microprocessor disable and enable logic providing a disabling signal to the disabling input in response to the indication that the refresh counter has reached the first predetermined count, and providing an enabling signal to the disabling input in response to the indication that the refresh counter has reached the second predetermined count; and a third compare circuit coupled to said refresh counter, said third compare circuit providing a refresh signal, wherein said three compare circuits are different circuits, and wherein said refresh counter is a single counter.

13. The system of claim 12, said speed control circuit further comprising:

an input/output register coupled to said bus, wherein said first predetermined count is held in said input/output register.

14. The system of claim 13, wherein said microprocessor provides a value to said input/output register such that the first predetermined count and the second predetermined count are of a ratio to simulate discrete operating speeds of older generation microprocessors.

15. The system of claim 14, wherein the discrete operating speed is suitable to run copy protected software on media in said peripheral storage device.

16. The system of claim 12, wherein said microprocessor further including a disableable level one cache, wherein the level one cache is disabled responsive to said logic providing the disabling signal.

17. The computer system of claim 12, said microprocessor disable and enable logic further comprising:

a flip-flop with a set input coupled to the indication that the refresh counter has reached the first predetermined count, with a clear input coupled to the indication that said refresh counter has reached the second predetermined count, and with an output coupled to said disabling input.

* * * * *